Dec. 24, 1968  KAZUO TSUZIHASHI ET AL  3,417,654
AUTOMATIC CONTINUOUS APPARATUS FOR PRODUCING DYNAMITE
Original Filed Sept. 7, 1965                        3 Sheets-Sheet 1
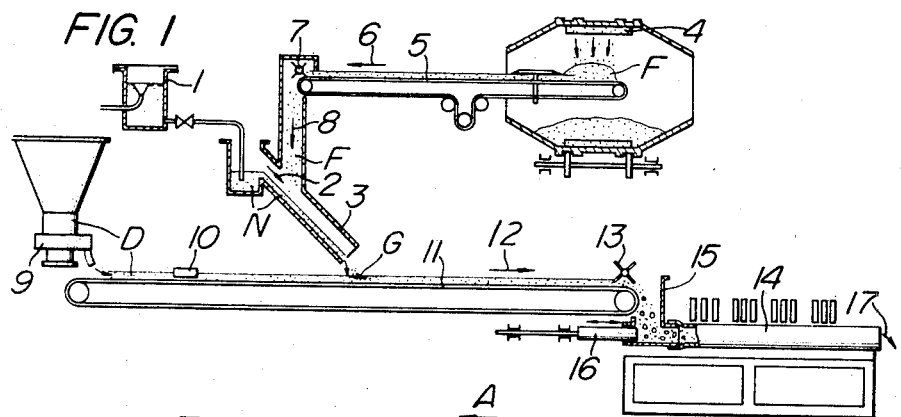
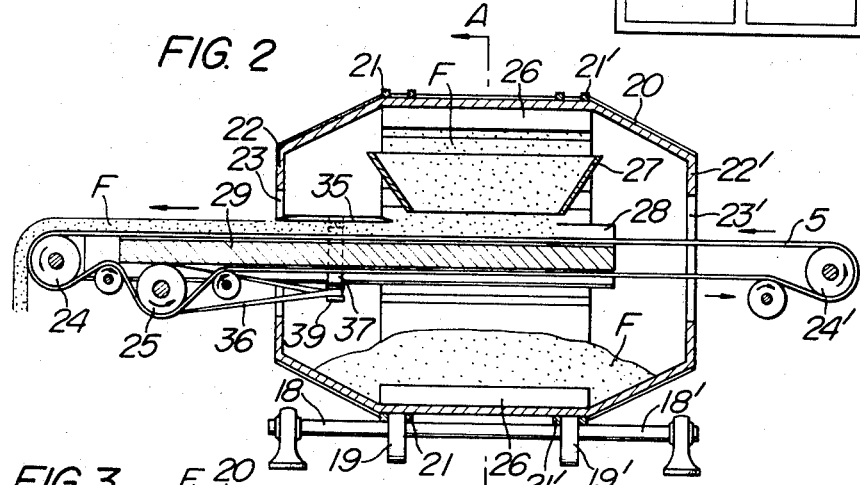
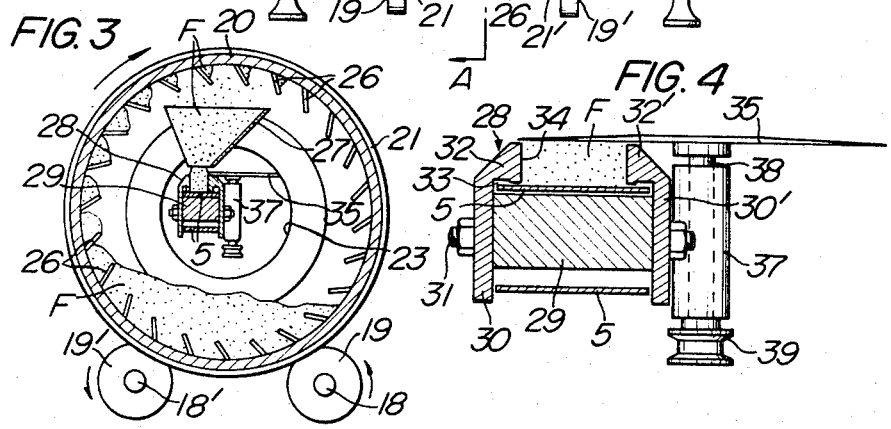

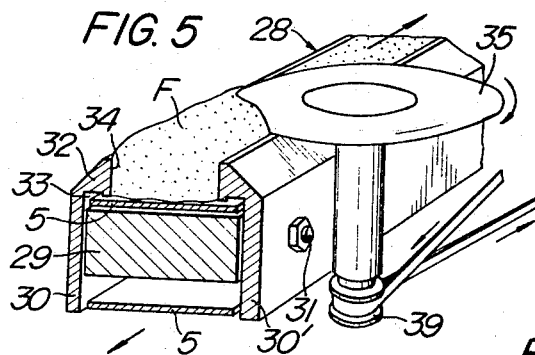
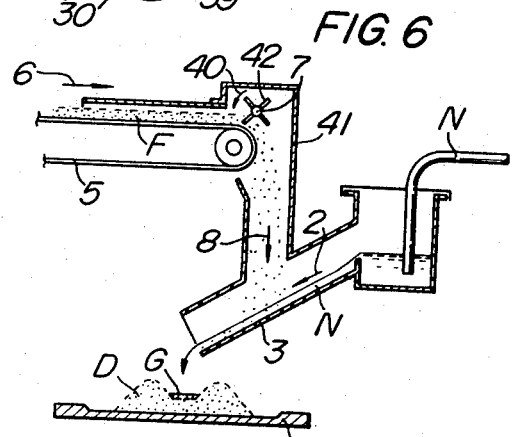
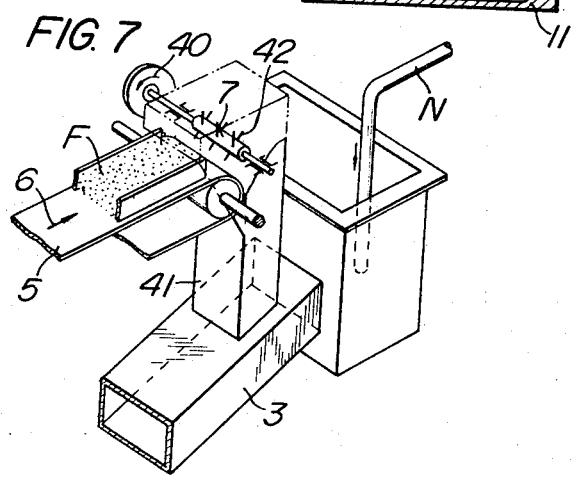

Dec. 24, 1968  KAZUO TSUZIHASHI ET AL  3,417,654
AUTOMATIC CONTINUOUS APPARATUS FOR PRODUCING DYNAMITE
Original Filed Sept. 7, 1965  3 Sheets-Sheet 3
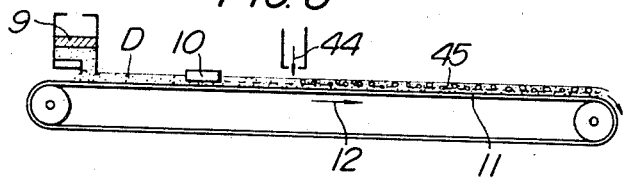
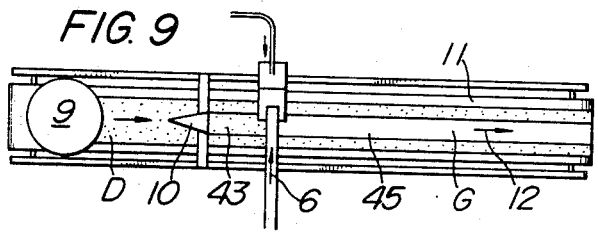
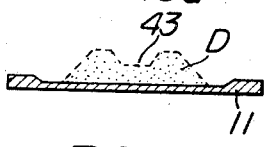
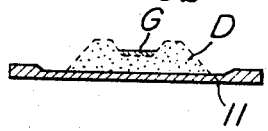
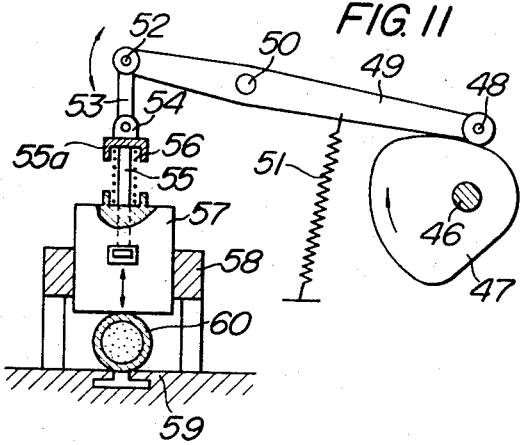
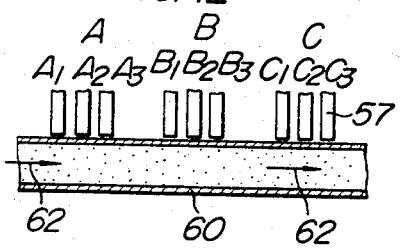
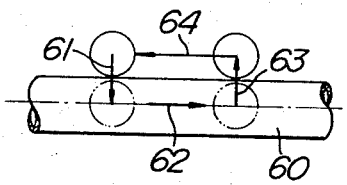

United States Patent Office 3,417,654
Patented Dec. 24, 1968

3,417,654
AUTOMATIC CONTINUOUS APPARATUS FOR PRODUCING DYNAMITE
Kazuo Tsuzihashi, Katsushige Matsumoto, Yoshichika Ueno, Toshiaki Okamoto, Kesatoshi Nagaoka, and Yasuhiro Ono, Nobeoka-shi, Japan, assignors to Asahi Kasei Kogyo Kabushiki Kaisha, Osaka, Japan, a corporation of Japan
Original application Sept. 7, 1965, Ser. No. 485,271, now Patent No. 3,329,540, dated July 4, 1967. Divided and this application June 2, 1966, Ser. No. 571,662
Claims priority, application Japan, Sept. 8, 1964, 39/50,636; Nov. 14, 1964, 39/64,063; Mar. 15, 1965, 40/15,159, 40/15,160, 40/15,161
5 Claims. (Cl. 86—1)

ABSTRACT OF THE DISCLOSURE

A constant volume feeding apparatus for wet collodion cotton comprising a rotary drum having opposite sides with openings and a plurality of lifting blades on the interior of the drum for lifting cotton from a mass in the drum at the bottom thereof. A conveyor belt extends through the drum and a pair of guide plates are mounted in the drum on both sides of the conveyor belt to straddle the same and define therewith a measuring chamber for receiving cotton from the lifting blades. Rotary cutters are disposed at the level of the top of the guide plates and adjacent the outlet opening of the drum for forming a continuous and constant level of cotton deposited into the measuring chamber.

---

This is a division of application Ser. No. 485,271, filed Sept. 7, 1965, now Patent No. 3,329,540.

The present invention relates to automatic and continuous operations of mixing, gelatinization and kneading in the production of dynamite and to apparatus for effecting the operations.

Today in the explosives industry, it is strongly required to establish an automatic continuous method for producing dynamite in place of the present batch system, in order to, first, decrease the amount of explosives in a working area, second, to protect the workers from injuries in case of an unexpected explosion and from nitroglycol poisoning during manufacture by adopting a remote operation, and last, to productivity.

At present, the manufacture of dynamite is generally carried out by the steps of nitration, mixing, gelatinization, kneading, forming and packing. And hitherto, these steps were all carried out batchwise.

In recent years, automatic continuous methods and machines have been developed for the nitration of glycerine and the forming of dynamite cartridges, and together with the adopting of remote operation, brought about a remarkable improvement in safety and productivity.

But, automatic continuous operation has not yet been established in the mixing, gelatinization, and kneading processes, and this has been a hindrance in the establishment of an automatic continuous method which covers the whole process of manufacturing dynamite.

The present invention provides an automatic continuous method which covers the whole manufacturing process of dynamite by developing automatic continuous method in the mixing, gelatinization and kneading processes whereby there is attained a great improvement in productivity and safety.

The development of an automatic continuous method in the mixing, gelatinization and kneading processes, has required the solution of numerous problems viz, constant feeding of nitroglycerine, wet collodion cotton, and so called "dope"; continuous mixing of nitroglycerine and wet collodion cotton; continuous gelatinization and constant feeding of the mixture of nitroglycerine and wet collodion cotton; and continuous kneading of all of the ingredients.

Among these unit operations, the constant feeding of nitroglycerine can be effected by employing an apparatus in which the level of the liquid is maintained constant and for the constant feeding of the "dope" a suitable apparatus is employed.

But the other unit operations, i.e. the constant feeding of wet collodion cotton, the continuous gelatinization and constant feeding of the mixture of nitroglycerine and wet collodion cotton, and the continuous kneading of all of the ingredients, have not been developed due to technical difficulties and safety problems.

An object of the invention is to provide methods and apparatus for overcoming the above difficulties and problems and enable the continuous manufacture of dynamite.

Nitroglycerine in the present specification refers to nitroglycerine and/or nitroglycol, or explosive oils which contain other additives. Wet collodion cotton refers to that which contains 15–70% of water and passes through a net of 5 mesh.

"Dope" in the present specification refers the ingredients of dynamite except the nitroglycerine and wet collodion cotton.

The present invention and the respective unit operations will be described in detail as follows referring to the drawings.

In the accompanying drawings,

FIG. 1 shows a brief flow sheet describing the method and apparatus of the present invention;

FIG. 2 is a front view in vertical section of apparatus for the constant feed of wet collodion cotton;

FIG. 3 is a view in cross section taken along line A—A in FIG. 2;

FIG. 4 is a front view, partly in section, of the embodiment of FIG. 2 illustrating a measuring guide and a rotary blade;

FIG. 5 is a perspective view of the mechanism in FIG. 4;

FIG. 6 is a vertical section view illustrating mixing of nitroglycerine and wet collodion cotton;

FIG. 7 is a perspective view of the apparatus of FIG. 6;

FIG. 8 is a side view of apparatus for continuously gelatinizing and transmitting the mixture of nitroglycerine and wet collodion cotton;

FIG. 9 is a plan view of the apparatus of FIG. 8;

FIG. 10a is a cross-sectional view of the groove formed by the "dope," wherein the mixture of nitroglycerine and wet collodion cotton is fed to be gelatinized;

FIG. 10b is a cross-sectional view illustrating the state in which the mixture rests in the groove.

FIG. 11 is a front view in section illustrating apparatus for the continuous kneading and transmitting of all the ingredients;

FIG. 12 is a side view in section which illustrates the relation between several pushing plates in apparatus of the present invention; and FIG. 13 illustrates another example of the present invention.

In the present invention each unit operation in combined with the others as illustrated in FIG. 1.

Therein nitroglycerine N is fed by a nitroglycerine constant feeder and flows downwards in the direction of arrow 2 as a thin layer on an inclined trough 3 which constitutes a mixing apparatus for nitroglycerine and wet collodion cotton.

The wet collodion cotton F is fed by a rotary drum type constant feeder 4 in the direction of arrow 8 and is scattered by needles 7 fixed on a rotor which is located at the end of the belt conveyor 5.

From the other direction, dope D is fed by a constant feeder in the direction of the arrow 12 by the belt conveyor 11, while a longitudinal groove is formed on the moving "dope" by a guide plate 10. Upon passage of the dope D beneath the trough 3 the mixture of nitroglycerine and wet collodion cotton is deposited into the groove. Being combined with the "dope" thereat, the nitroglycerine gel and "dope" are transmitted in the direction of the arrow 12 to the end of the belt conveyor in a constant ratio thereof.

There, they are fed into the hopper 15 of the continuous kneader and are cut into small portions by a cutting blade 13 in order to maintain the ratio unchanged and thereafter are charged into a tubular continuous kneading machine 14 by piston-feeder 16 where the material is continuously kneaded and thereafter discharged in the direction of the arrow 17.

The individual process operations will next be described in detail as follows.

At first, will be described the rotary feeding unit 4 for the continuous feeding of a definite amount of the wet collodion cotton.

The unit 4 operates by continuously feeding a definite amount by measuring the volume of the wet collodion cotton.

Many types of efficient constant feeder devices have been developed for ordinary powdery substances, but they are not suitable for wet collodion cotton which lacks fluidity, easily gets lumpy, easily changes its apparent specific gravity by slight external force and easily cross-links.

FIGS. 2 and 3 illustrate the mechanism for uniformly charging the wet collodion cotton F onto the volume measuring guide 28.

A pair of parallel transmission axles 18 and 18' with friction wheels on pulleys 19 and 19' thereon are rotated by a transmission unit. A rotary drum 20 is driven by said pulleys 19 and 19', circumferential ring rails 21 and 21' being mounted on said drum and embracing the pulleys 19 and 19' to resist axial displacement of the drum. The side walls 22 and 22' of the drum have openings 23 and 23', and the belt conveyor 5 passes longitudinally through the central part of the drum and over pulleys 24 and 24' and drive pulley 25.

A plurality lifting blades 26 are provided on the inside wall of the central portion of the drum inclined in the rotating direction of the drum as shown in FIG. 3, and a hopper like chute 27 is provided on the top of the central portion within the cavity of the drum. As the drum 20 rotates the lifting blades 26 fixed on the inside wall of the said drum 20 scoop and lift wet collodion cotton and, without changing the shape and apparent specific gravity thereof, deposit it into the chute 27 where it then flows to volume measuring guide 28 and piles up higher than the height of the volume-measuring guide 28.

As shown in FIG. 4, the volume measuring guide comprises side plate 30 and 30', the upper portion of which are narrowed, said plates 30, 30' being fixed by a fixing rod 31 to both sides of a long supporting base 29 provided along the axis of the drum. Between the supporting base 29 and the narrowed portion of the side plates 30 and 30', there exists an opening 33 through which the upper portion of the conveyor 5 passes, while the lower portion of the conveyor 5 passes beneath the lower portion of the supporting base 29.

A space 34 is defined between the portions 32 and 32' of the side plates 30 and 30', and the conveyor 5 runs at the bottom of the space 34. The wet collodion cotton F is deposited into the space 34 and is continuously piled on the conveyor 5 to be transmitted for discharge past a scraper 35 where the quantity of cotton F is leveled. Accordingly, the amount of cotton fed can be changed in a wide range by changing the belt speed.

The number and the size of the lifting blades and the angle thereof can be suitably changed according to the amount to be measured. Furthermore, the width of the volume measuring guide 28 can be also changed. The chute 27 is especially effective to change the wet collodion cotton into the volume measuring guide 28.

Moreover, the belt conveyor 5 is fixed in a definite plane by the supporting base 29. The rotary blade scraper 35 which removes the portion of the wet collodion cotton higher than the height of the volume measuring guide is set in the said drum 20.

In operation, the wet collodion cotton F is lifted upwards by the blade 26 and falls continuously into the volume measuring guide 28 directly or through the chute 27, and accumulates to a height greater than the height of the said guide and is carried by the belt conveyor 5 driven by the moving pulley 25 in the direction of the arrow in FIG. 2.

The wet collodion cotton piled higher than the height of the volume-measuring guide 28, i.e., higher than portions 32 and 32' of the side plates 30 and 30' is removed by the rotary scraper 35 and the remainder of the collodion cotton which will be a constant amount is transmitted onwards.

FIGS. 4 and 5 illustrate a device for removal of the wet collodion cotton F piled higher than the volume-measuring guide 28, said device comprising a rotary axle 38 in a vertical sleeve 37 driven by a belt 36 from the moving pulley 25 (FIG. 2), the rotary scrapper 35 being fixed on the rotary axle 38 and being rotated in a plane immediately above portions 32 and 32' of the side plates 30 and 30' to remove the wet collodion cotton F piled higher than the height of the volume-measuring guide 28.

The wet collodion cotton becomes easily interwined and lacks fluidity, so that a brush or a fixed scraper cannot remove the wet collodion cotton uniformly and form a plane upper surface. However, the rotary blade of the present invention can remove it uniformly and form such a plane surface.

The charging of the raw materials into the rotary drum 20 can be carried out intermittently for a period of time from a few minutes to several tens of minutes because the accuracy of the continuously measured and fed amount is not related to the quantity of the wet collodion cotton in the rotary drum 20.

As explained above, the constant feeding of the wet collodion cotton which is very difficult with conventional methods, has been skillfully carried out with the apparatus of the present invention. The apparatus for constant feeding of the wet collodion cotton is compact and easily operated. A practical example of the present invention will be described as follows. It goes without saying that size, speed and the like can be freely changed according to the capacity.

Diameter of the rotary drum: 100 cm.
The shape of the volume-measuring guide 3 cm. in width, 1.5 cm. in height.
The speed of the belt: 1–10 c.m./sec.
The speed of the rotary drum: 10 r.p.m.
Lifting blade: 18 cm. in length, 2 cm. in height. 25 blades.

As explained above the present invention has the following effective characteristics:

(1) The wet collodion cotton can be continuously fed in a definite amount without changing its shape and apparent specific gravity.
(2) Measuring accuracy is very high.
(3) Continuous operation can be carried out smoothly.
(4) The wet collodion cotton does not cross-link.
(5) The feeding speed can be infinitesimally changed in a wide range.
(6) The unit is compact. The continuous mixing and feeding of the wet collodion cotton and nitroglycerine will be next described as follows:

At present, there are known methods for the continuous mixing of liquid with solids. However, when these methods are applied in mixing nitroglycerine with wet collodion cotton, the gelatinizing phenomena begins in 10-15 seconds after mixing, resulting in a viscous, adhesive and elastic mixture, in which the nitroglycerine is sensitive to friction and shock whereby great danger of explosion exists. The present invention avoids this difficulty.

The relation between the continuous mixing of the wet collodion cotton with the nitroglycerine and the continuous gelatinizing and feeding thereof is described in conjunction with the apparatus shown in FIG. 6.

The nitroglycerine is continuously fed in a definite amount by the continuous measuring and feeding unit 1 as illustrated in FIG. 1 and flows down in the form of a thin film in the direction of the arrow 2 while widening uniformly in the direction of width in the inclined trough 3.

At the same time, the wet collodion cotton F fed continuously in a definite amount by the rotary drum feeder is conveyed in the direction of the arrow 6 by the belt conveyor 5, to unit 7 wherein the massive wet collodion cotton is scattered uniformly by the unit 7 which rotates in the direction of the arrow 40, and falls continuously in the direction of the arrow 8.

The falling area of the wet collodion cotton is controlled by the guide 41 which is slightly narrower than the trough 3. The wet collodion cotton deposited onto the thin film of the nitroglycerine flowing down along the trough 3, absorbes nitroglycerine while flowing downwardly together with the nitroglycerine, to be dispersed and mixed with the nitroglycerine. A uniform mixture of nitroglycerine and wet collodion cotton is discharged onto the groove of the dope D on the belt conveyor 11 in FIG. 6. This nitroglycerine gel is shown by G. Therefore, in the present invention, the nitroglycerine and the wet collodion cotton are continuously mixed with each other on the inclined trough 3 within a distance of several centimeters and in less than several seconds so that the mixture of the nitroglycerine and the wet collodion cotton is not yet gelatinized, and therefore, the nitroglycerine gel does not adhere to the mixing unit.

Furthermore, it goes without saying that the angle of inclination and the size of the trough 3 can be changed suitably according to the feeding amount of the nitroglycerine, while the size of the guide 41 for controlling the dispersing area of the wet collodion cotton can be changed according to the width of the inclined trough 3. The dispersing unit 7 for dispersing the wet collodion cotton is illustrated in detail in FIG. 7, which shows projecting wires 42 of about 3 mm. in diameter and 20 mm. in length disposed at the periphery of the cylinder.

The above construction according to the present invention has the following effective characteristics:

(1) The mixing of the nitroglycerine with the wet collodion cotton does not involve any mechanical operations, so that it is quite safe.

(2) The mixing can be carried out quite uniformly so far as the balance of the feeding of the nitroglycerine and the wet collodion cotton in a definite amount is not disturbed.

(3) The mixing is carried out in an extremely short time period, so that the mixture of the nitroglycerine and the wet collodion cotton does not undergo gelatinization in the mixing unit, and therefore there is no adhesion of the gel in the trough.

(4) The mixing operation is very simple and can be easily effected.

There will next be described the feeding of the nitroglycerine gel and the dynamite raw materials in a definite amount into the continuous kneading device.

As illustrated in FIGS. 8 and 9, the "dope" which consists of sodium nitrate, ammonium nitrate, starch and the like, is continuously fed in a definite amount by the constant feeding unit 9 onto the belt conveyor 11 in the direction of arrow 12 while forming with guide 10 the longitudinal groove 43 for receiving and gelatinizing the mixture of the nitroglycerine and the wet collodion cotton. FIG. 10a illustrates the cross section of the formed groove.

The uniform mixture of the nitroglycerine and the wet collodion cotton fed constantly from the former processes, is fed in a definite amount onto the groove 43 in the direction of the arrow 44, and is subjected to being gelatinized while being continuously transferred together with the "dope" D, The nitroglycerine and collodion is shown in a gel state illustrated by reference numeral 45 in FIG. 9.

The cross-section of the moving dope and the mixture of the nitroglycerine and the wet collodion cotton is shown in FIG. 10b. The ratio of the dope to the mixture of the nitroglycerine and the wet collodion cotton can be changed by changing their feeding speeds. Therefore, when these feeding amounts or the speed of the belt conveyor are kept constant, the nitroglycerine and "dope" can be always fed in a definite amount in a fixed ratio. Moreover, the gelatinizing degree of the nitroglycerine gel can be freely changed by changing the length of the belt conveyor.

This predetermined ratio is maintained unchanged along the whole length of the conveyor belt, because the belt is designed to move horizontally at a steady moving speed, and the dope is conveyed at the same steady speed on the moving belt without any change in the cross-section of the horizontal groove made by the guide, while the mixture of the nitroglycerine and the wet collodion cotton, which is deposited into said groove, moves, consequently, at the same steady speed together with the dope which maintains its cross-section constant. The adhesion of the nitroglycerine gel to the wall of the gelatinization apparatus, which usually is troublesome in continuous gelatinization of nitroglycerine and nitrocellulose, is not a problem in the present method where, as explained above, gelatinization is carried out in the groove of the dope which operates here as a vessel, and the dope is conveyed together with the nitroglycerine gel.

Furthermore, the nitroglycerine does not permeate the dope, and does not wet the conveyor belt 11.

Since the nitroglycerine gel and the "dope" are kept in the predetermined mixing ratio along the length of the belt conveyor, continuous and uniform kneading is easily carried out in the subsequent step.

The aspect of the present invention as described above, has the excellent effects which are described as follows:

(1) A continuous gelatinization of the nitroglycerine and the wet collodion cotton can be easily carried out.

(2) The mixture of the nitroglycerine and the wet collodion cotton is gelatinized after being fed in a predetermined amount, so that the continuous feeding of the nitroglycerine gel in a predetermined amount can be easily carried out.

(3) The gelatinizing vessel is the "dope" itself so that the adverse influences for the continuous feeding and for the feeding in a predetermined amount caused by the adhesion of the gel to the gelatinizing vessel is not present.

(4) The nitroglycerine gel and the "dope" in the present invention are in a definite ratio along the entire length of the belt conveyor, so that continuous kneading can be carried out.

(5) No mechanical operations are required in the gelatinizing and feeding units of the nitroglycerine gel so that the method is quite safe.

(6) The mixing ratio of the nitroglycerine gel in the dynamite can be changed easily and continuously.

(7) The gelatinizing degree of the nitroglycerine gel can be freely changed to obtain nitroglycerine gel having several kinds of gelatinizing degrees.

In the next operation as seen in FIG. 1, the dynamite raw materials composed of the nitroglycerine gel and the "dope" in a definite ratio is cut in fixed lengths by the cutting plate 13 provided at one end of the belt conveyor 11 without affecting the mixing ratio of the nitroglycerine gel and the "dope," and fed into the hopper 15, and successively charged in fixed amount into the tubular continuous kneading machine 14 by the reciprocating piston feeder 16 which moves in synchronism with the movement of the pressing plate.

The tubular continuously kneading device will next be described with reference to FIGS. 11, 12 and 13.

The dynamite raw materials are fed into a flexible tube composed of a non-metallic material, for example, rubber, plastic, cloth, leather and the like, successively kneaded and continuously advanced from outside the tube.

The cross section of the tube may be circular, elliptical, rectangular or the like. The length of the tube is a function of the kind of dynamite employed, generally being 1 to several meters in length. The invention contemplates the provision of several pushing plates, mounted outside the tube each pushing plate being regularly reciprocated at a definite period to produce kneading, shearing, compressing and transmission of the dynamite.

Several rollers one of which is illustrated in FIG. 13, are introduced into the tube 60 and moved along the path of arrows 61–64. First, the rollers descend into the tube in the direction of the arrow 61, to press and shear the explosives in the tube 60;

Various kinds of operations, such as diffusing, kneading and the like, are carried out by the movement of the rollers in the direction of the arrow 62, to make the explosives advance;

Then, the rollers return to the original level outside the tube by a vertically ascending movement in the direction of the arrow 63;

Finally, the rollers return to their original position by the movement in the direction of the arrow 64.

The shearing, pressing and kneading effects differ according to the shape and the cross-section of the tube; the diameter of a circular tube is suitable within the range of 2 cm. to 5 cm. Moreover, the number and spacing of the kneading and transmitting means provided outside the tube is a function of the kind of raw materials and the mixing ratio. Suitable results are generally attainable by a few groups to 20 groups at intervals of several cm. to 20 cm.

FIG. 11 illustrates the function of a single pushing plate for kneading and advancing the contents by acting on the flexible tube from above. The lever 49 moves vertically about the supporting pivot 50 as a fulcrum by rotation of the transmission shaft 46 and the cam 47 fixed thereon. The lever 49 is in contact with the cam 47 by the action of tension spring 51. A vertical shaft 55 is connected to connecting rod 53 via rim 55a and pin 54 and the rod 53 is connected to the lever 49 by pivot 52. A compression spring 56 is interposed between rim 55a and plate 57. The plate 57 acts on flexible tube 60 arranged on a supporting base 59 by movement in a guide 58 fixed in the machine frame. The explosives in the flexible tube 60 are suitably kneaded and advanced as illustrated in FIG. 12, in the direction of arrows 62. It is generally preferable that three pushing plates are coupled together in one group as shown in FIG. 12, but it is also possible to couple less or more than three pushing plates together.

In FIG. 12, the pushing plate $A_1$ of group A acts on the tube, and the pushing plate $A_2$ descends before the pushing plate $A_1$ begins to ascend. Similarly, the pushing plate $A_3$ descends before the pushing plate $A_2$ begins to ascend. The operations are successively repeated to knead the explosives 61 in the said tube 60. The position differences of the vertical movement of the respective pushing plate $A_1$, $A_2$ and $A_3$ are defined by the design of the corresponding cam. The pushing plates $B_1$, $B_2$ and $B_3$ in the B group and $C_1$, $C_2$ and $C_3$ in the C group are also in the similar relation. The explosives are kneaded, sheared and compressed in the tube and are conveyed in the direction of the arrow 62 to carry out continuous kneading and advancement.

A practical example of the method and apparatus of the present invention as defined above will next be described below, wherein it goes without saying that the size of the components and speed of operation can be freely changed so as to fit the type of dynamite and the degree of mixing desired.

The tube employed: Circular rubber tube having 70 mm. inside diameter and 80 mm. external diameter.
Length of the tube: 1 meter.
The pushing plate: 20 mm. in thickness, 200 mm. in width, 10 groups, each of which consists of 3 metallic plates.
The rotation speed of the cam: 60 r.p.m.
The kneading time: 20 seconds.
Kneading capacity: 600 kg./hour.

The above aspect of the present invention has the following characteristics and advantages:

(1) The portion of the kneading apparatus directly in contact with the explosives is non-metallic material, for example, rubber, cloth, plastic, leather and the like, so that it eliminates the danger of shock or friction even when a foreign substance enters the tube.

(2) The explosives can be continuously produced by charging explosive raw materials continuously in an automatic fashion, so that the amount of explosives in the kneading tube can be remarkably reduced in comparison with previous methods. Therefore, the present method is outstanding in minimizing danger while at the same time enabling a completely remote control.

(3) A continuous transfer between the kneading apparatus and its entry and exit is possible since the present invention is a completely continuous method.

(4) The capacity of the kneading apparatus can be changed easily and in a wide range by changing the rotation speed and the diameter of the tube.

(5) The kneading performance by the present invention is comparable with that of the planetary-type kneading machine generally employed.

(6) The operations of the present invention are simple, and eliminate the main hazards caused by the carelessness of the operators.

In summary, the overall method of the present invention has a number of advantages which are not present in the conventional batch system.

The production of dynamite in the present invention is carried out fully automatically and continuously by a remote control system in a comparatively short time, with a remarkable increase in the productivity, and the mixing, the gelatinization and the kneading are carried out centralized in one plant, in which the amount of explosives is substantially less than that in the batch process, whereby, the present process is superior from the standpoint of safety.

What is claimed is:

1. Constant volume feeding apparatus for wet collodion cotton comprising a rotary drum having opposite sides with openings, a plurality of lifting blades on the interior of the drum for lifting cotton from a mass in the drum at the bottom thereof, a conveyor belt extending through said drum, a pair of guide plates in the drum on both sides of the conveyor belt straddling the same and defining therewith a measuring chamber for receiving cotton from the lifting blades, and rotary cutter means at the level of the top of the guide plates and disposed adjacent the outlet opening of the drum for forming a continuous and constant level of cotton deposited into the measuring chamber.

2. Apparatus as claimed in claim 1 wherein said blades are inclined relative to the drum in the direction of rotation thereof.

3. Apparatus as claimed in claim 1 wherein said rotary cutter means comprises a cutter blade adapted for rotation above an axis perpendicular to the conveyor belt and offset therefrom.

4. Apparatus for continuous gelatinization of nitroglycerine and wet collodion cotton comprising a trough inclined with the horizontal for the flow of nitroglycerine in the form of a film, means above the trough for constantly scattering wet collodion cotton onto the nitroglycerine film flowing in the trough to form a mixture thereof, a conveyor belt for transporting a dope component to be mixed with the cotton and the nitroglycerine, said conveyor belt being disposed underneath the trough at the lower end thereof, and guide plate means for forming a longitudinal groove on the upper surface of the advancing dope for the receipt of the mixture of cotton and nitroglycerine so that the same can gelatinize in said groove.

5. Apparatus for continuously producing dynamite comprising a rotary drum having opposite sides with openings, a plurality of lifting blades on the interior of the drum for lifting wet collodion cotton from a mass thereof in the bottom of the drum, a conveyor belt extending through said drum, a pair of guide plates in the drum on both sides of the conveyor belt straddling the same to define therewith a measuring chamber for receiving wet cotton from the lifting blades, rotary cutter means at the level of the top of the guide plates disposed adjacent the outlet opening of the drum to form a continuous and constant level of cotton which is deposited into the measuring chamber and fed therefrom whereby a constant volume of cotton advances on said belt after the rotary cutter means, a trough inclined with the horizontal for the constant flow of nitroglycerine in the form of a film, means for receiving the cotton from said belt and scattering the cotton in constant volume feed onto the nitroglycerine film to form a mixture therewith, a second conveyor belt for continuous transport of a dope component to be mixed with the cotton and the nitroglycerine to form dynamite, said second conveyor belt being disposed beneath the trough at the lower end thereof for receiving the mixture therefrom, guide plate means for forming a longitudinal groove on the upper surface of the advancing dope for the receipt of the mixture of cotton and nitroglycerine therein, said conveyor belt advancing the dope and the mixture of cotton and nitroglycerine beyond the trough to enable the cotton and nitroglycerine to gelatinize in the groove of the dope, a flexible tube, means for feeding the gelatinized mixture and the dope into the tube and means for periodically and successively subjecting the tube to external force at a number of locations along the length thereof to deform the tube and knead the gelatinized material and dope therein while advancing the same through the tube at a uniform speed.

References Cited

UNITED STATES PATENTS

| | | | |
|---|---|---|---|
| 3,329,540 | 7/1967 | Tsuzihashi et al. | 149—97 X |
| 2,412,397 | 12/1946 | Harper | 103—148 |
| 3,175,498 | 3/1965 | Rohrer | 103—148 X |

BENJAMIN A. BORCHELT, *Primary Examiner.*

G. H. GLANZMAN, *Assistant Examiner.*